(12) United States Patent
Nguyen et al.

(10) Patent No.: US 12,165,518 B2
(45) Date of Patent: Dec. 10, 2024

(54) PARKING ASSIST SYSTEM

(71) Applicant: SUBARU CORPORATION, Tokyo (JP)

(72) Inventors: Cong Kien Nguyen, Tokyo (JP); Masayoshi Koiji, Tokyo (JP); Otoki Yagi, Tokyo (JP); Tomomi Heta, Tokyo (JP); Reo Harada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 334 days.

(21) Appl. No.: 17/866,236

(22) Filed: Jul. 15, 2022

(65) Prior Publication Data

US 2023/0023365 A1 Jan. 26, 2023

(30) Foreign Application Priority Data

Jul. 26, 2021 (JP) .................................. 2021-121762

(51) Int. Cl.
*G05D 1/00* (2024.01)
*G08G 1/14* (2006.01)
*G08G 1/16* (2006.01)

(52) U.S. Cl.
CPC ............. *G08G 1/168* (2013.01); *G08G 1/141* (2013.01)

(58) Field of Classification Search
CPC ..................................................... G08G 1/168
See application file for complete search history.

(56) References Cited

U.S. PATENT DOCUMENTS

2005/0285758 A1 12/2005 Matsukawa

FOREIGN PATENT DOCUMENTS

JP 2006-007875 A 1/2006

*Primary Examiner* — Vivek D Koppikar
*Assistant Examiner* — Paul W Arellano
(74) *Attorney, Agent, or Firm* — Rimon P.C.

(57) ABSTRACT

A parking assist system for a vehicle includes the following elements. A parking space width calculator is configured to calculate a parking space width between objects. A parking width comparator is configured to compare the parking space width with the width of a virtual parking region. A movement trace detector is configured to detect a movement trace within the virtual parking region. A target detector is configured to determine whether a target faces at least one side of the virtual parking region other than the side near the vehicle. A parking priority setter is configured to set a parking priority for the virtual parking region based on a movement trace and an object. A display selector is configured to display parking space candidates based on parking priority and instructs a driver to select a parking space candidate.

7 Claims, 16 Drawing Sheets

PARKING ASSIST SYSTEM

CROSS-REFERENCE TO RELATED APPLICATIONS

The present application claims priority from Japanese Patent Application No. 2021-121762 filed on Jul. 26, 2021, the entire contents of which are hereby incorporated by reference.

BACKGROUND

The disclosure relates to a parking assist system which informs a driver of a parking priority used for selecting one of plural parking spaces detected in a parking lot where the lines of parking spaces drawn on the road surface are not recognized.

Hitherto, a parking assist system which assists a driver in parking a vehicle within the lines of a parking space in a parking lot so as to reduce the burden on the driver is known. In this type of parking assist system, while a driver is driving a vehicle in a parking lot, a control unit detects options of available parking spaces and displays the detected options on a monitor. The driver then selects a desired one of the parking space options.

Then, the control unit forms a parking guiding route for guiding the vehicle to park in the parking space selected by the driver and guides the vehicle to the parking space along the parking guiding route. Alternatively, the driver drives and parks the vehicle by himself/herself by following the parking guiding route displayed on the monitor.

In the above-described known parking assist system, to let a vehicle park in a parking space, the lines of available parking spaces are first detected. If the road surface in a parking lot is covered with snow or mud after flooding, however, the parking space lines drawn on the road surface are difficult to recognize. In such a case, the parking assist system may fail to form a parking guiding route for guiding the vehicle to a parking space.

A driver usually wants assistance from a parking assist system under such a poor environment where parking space lines are difficult to recognize rather than under a good environment. Japanese Unexamined Patent Application Publication (JP-A) No. 2006-7875, for example, discloses the following technology. It is first checked whether there is a space for parking a vehicle between two vehicles parked side by side. A gap between the parked vehicles is calculated by subtracting a half of the total width of the parked vehicles from the center-to-center distance in the widthwise direction of the parked vehicles. If this gap is larger than a value obtained by adding a certain margin to the width of the vehicle, it is determined that the vehicle can be parked in this gap. Then, the center of this gap is set to be that of a park-to-be region and the vehicle is guided to the center of this region.

SUMMARY

An aspect of the disclosure provides a parking assist system configured to guide a vehicle to a parking capable space in a parking lot. The parking assist system includes an environment information obtainer, a storage, a parking space width calculator, a parking width comparator, a virtual parking region setter, a movement trace detector, an object detector, a parking priority setter, a display selector, and a parking assister. The environment information obtainer is configured to obtain environment information on an environment around the vehicle. The storage is configured to store data on a virtual parking region to be used for parking the vehicle. The parking space width calculator is configured to calculate a width of a parking space between objects, based on the environment information obtained by the environment information obtainer. The parking width comparator is configured to compare the width of the parking space with a width of the virtual parking region stored in the storage. The virtual parking region setter is configured to set the virtual parking region in the parking space in a case where the parking width comparator has determined that the width of the parking space is larger than or equal to the width of the virtual parking region. The movement trace detector is configured to detect a movement trace within the set virtual parking region set by the virtual parking region setter, based on the environment information obtained by the environment information obtainer. The object detector is configured to determine whether an object of the objects faces at least one of sides of the virtual parking region other than a side of the virtual parking region close to the vehicle. The parking priority setter is configured to set a parking priority for the virtual parking region in accordance with the movement trace detected by the movement trace detector and the object which faces the virtual parking region detected by the object detector. The display selector is configured to display parking space candidates together to instruct a driver of the vehicle to select one of the displayed parking space candidates. The parking space candidates includes the parking space candidate obtained by linking the corresponding parking priority set by the parking priority setter to the corresponding virtual parking region set by the virtual parking region setter. The parking assister is configured to set the parking space candidate selected by the driver using the display selector to a target parking space and to guide the vehicle to the target parking space.

An aspect of the disclosure provides a parking assist system configured to guide a vehicle to a parking capable space in a parking lot. The parking assist system includes a sensor, a storage, and circuitry. The sensor is configured to obtain environment information on an environment around the vehicle. The storage is configured to store data on a virtual parking region to be used for parking the vehicle. The circuitry is configured to calculate a width of a parking space between objects, based on the environment information obtained by the sensor. The circuitry configured to: calculate a width of a parking space between objects, based on the environment information obtained by the sensor; compare the calculated width of the parking space between the objects with a width of the virtual parking region stored in the storage; set the virtual parking region in the parking space in a case where the width of the parking space is found to be larger than or equal to the width of the virtual parking region; detect a movement trace within the set virtual parking region, based on the environment information obtained by the obtainer; determine whether an object of the objects faces at least one of sides of the virtual parking region other than a side of the virtual parking region close to the vehicle; set a parking priority for the virtual parking region in accordance with the detected movement trace and the detected object which faces the virtual parking region; display parking space candidates together to instruct a driver of the vehicle to select a parking space candidate, the parking space candidates include the parking space candidate obtained by linking the parking priority to the virtual parking region; and set the parking space candidate selected by the driver to a target parking space to guide the vehicle to the target parking space.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
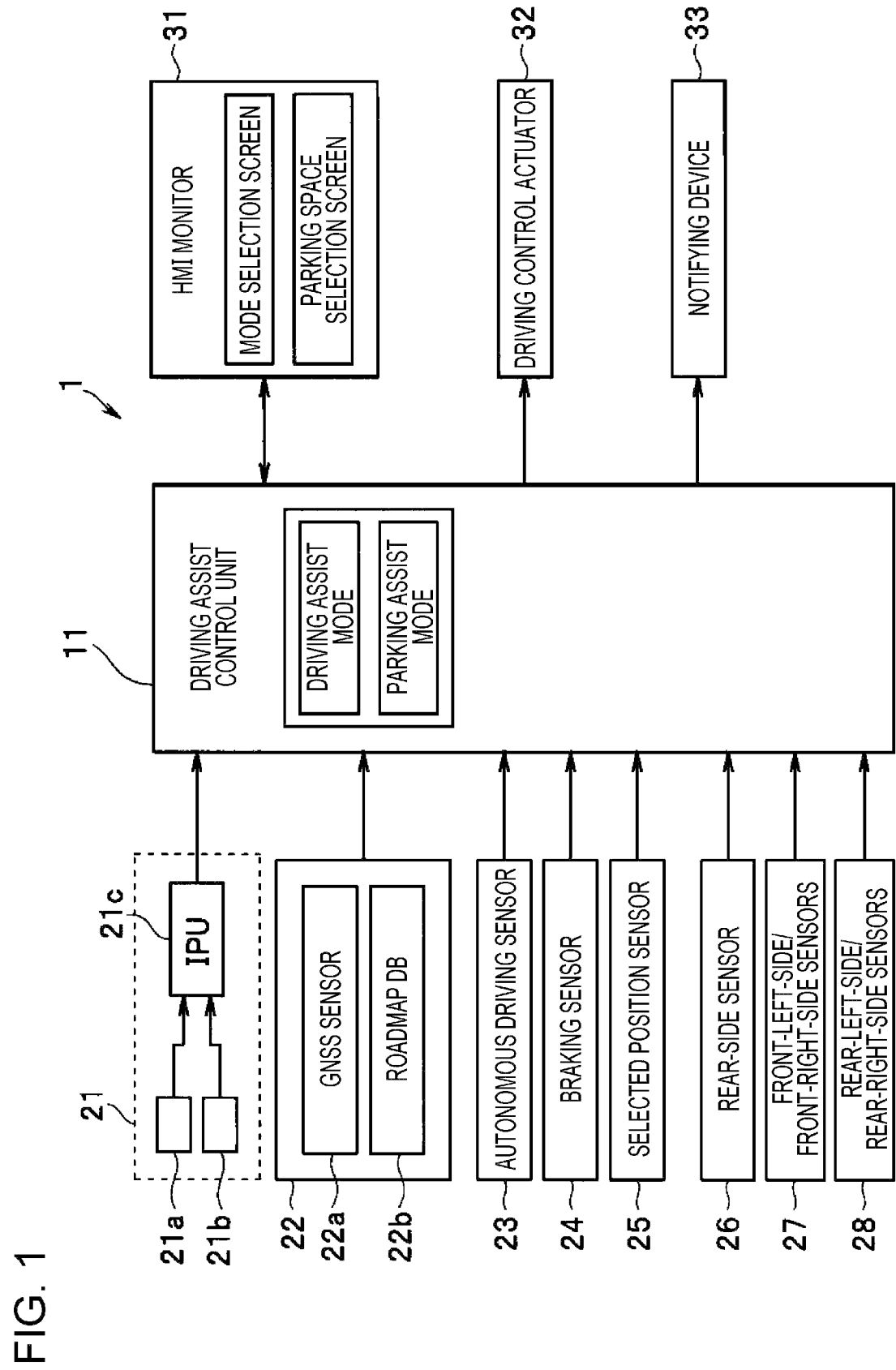
FIG. 1 is a schematic block diagram of a parking assist system.

It is difficult for a driver to park a vehicle always at the same position in a parking lot of a store, for example, because the parking situation is different depending on the positions of other vehicles parked in the parking lot. Additionally, the layout of parking spaces in a parking lot varies among individual stores.

As disclosed in JP-A No. 2006-7875, a space for parking a vehicle may be detected between two vehicles parked side by side. However, if the road surface of a parking lot is covered with snow or mud after flooding, for example, it is not possible to recognize the lines of a parking space drawn on the road surface, and it is possible that the detected space between the two parked vehicles be a sidewalk or a driving lane where parking is prohibited.

In the technology disclosed in JP-A No. 2006-7875, whether a vehicle can park is determined merely based on the distance of a detected space between adjacent parked vehicles. Hence, a control unit may guide the vehicle to a sidewalk or a driving lane between parked vehicles where parking is prohibited.

On the other hand, even when the control unit determines that a space between adjacent parked vehicles is likely to be a sidewalk or a driving lane, a driver may recognize from the surrounding situation that this space is apparently a parking space. In this manner, if the driver is provided with a determination result different from what the driver actually identifies, he/she may be disappointed. Nonetheless, informing a driver of the presence of every single detected space, including a space determined to be a sidewalk or a driving lane, and asking the driver whether to select the space may impose a burden on the driver.

It is thus desirable not to ask a driver whether to select a parking space every time a parking space between parked vehicles is detected under a poor environment where the lines of a parking space are not recognized. It is also desirable to provide a parking assist system that can reduce the burden on a driver by not asking the driver whether to select a parking space in the above-described manner when assisting the vehicle in parking in a parking space using a parking assist function.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 9:
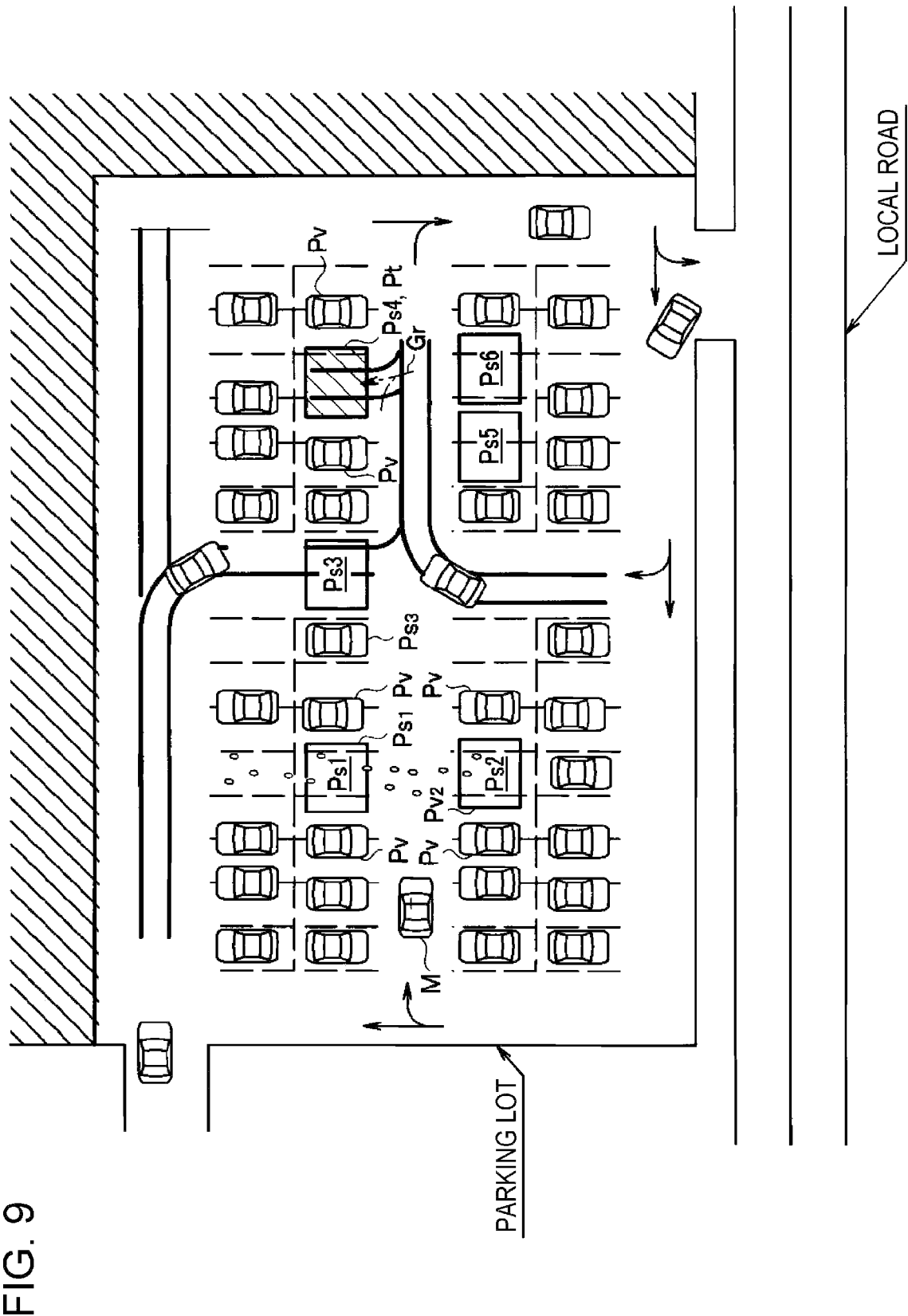
FIG. 9 is a bird's eye view of the entire parking lot including parking space candidates.

A parking assist system 1 illustrated in FIG. 1 is installed in a vehicle M (see FIG. 9). The parking assist system 1 includes a driving assist control unit 11. The driving assist control unit 11 is constituted by a microcontroller including a central processing unit (CPU), a random access memory (RAM), a read only memory (ROM), a rewritable non-volatile memory (such as a flash memory or an electrically erasable programmable read only memory (EEPROM)), and a peripheral device. In the ROM, programs and fixed data, such as those for executing processing by the CPU, are stored. The RAM serves as a work area which is used for the CPU and temporarily stores various items of data used by the CPU. The CPU is also called a microprocessor (MPU) or a processor. Instead of a CPU, a graphics processing unit (GPU) or a graph streaming processor (GSP) may be used. Alternatively, a CPU, a GPU, and a GSP may be selectively combined and used.

When a driver has selected a desired assist mode, the driving assist control unit 11 performs driving assist in the selected assist mode. Assist modes provided by the driving assist control unit 11 are a driving assist mode and a parking assist mode.

The driving assist mode is executed by the driving assist control unit 11 in the following manner. Based on vehicle position information obtained by a global navigation satellite system (GNSS) sensor 22a of a map locator unit 22, which will be discussed later, the driving assist control unit 11 performs map matching to match the position of the vehicle M onto a roadmap stored in a roadmap database 22b. The driving assist control unit 11 then causes the vehicle M to autonomously drive along a preset target traveling road in a self-driving zone. On a driving road where autonomous driving is difficult, the driving assist control unit 11 performs known driving control, such as vehicle-to-vehicle distance control (adaptive cruise control (ACC)), active lane keep (ALK) control, and lane departure prevention (LDP) control, to cause the vehicle M to drive along a driving lane and, if a leading vehicle is detected, to follow the leading vehicle.

After the vehicle M has entered a parking lot, when the driver selects the parking assist mode while driving the vehicle M by himself/herself in the parking lot, the driving assist control unit 11 searches for a space where the vehicle M can park (hereinafter may also be called a parking capable space) and lets the driver know. When the driver selects one of the parking capable spaces, the driving assist control unit 11 causes the vehicle M to automatically park in the selected space. Alternatively, the driving assist control unit 11 displays a parking guiding route on a plan view of a vehicle image and a surrounding image displayed on a human machine interface (HMI) monitor 31, so as to assist the driver in parking the vehicle M in the selected space by himself/herself. Details of the HMI monitor 31 will be discussed later.

Sensors and units that obtain information on the driving state (including the position and the direction) of the vehicle M and surrounding environment information of the vehicle M, which are used for executing the driving assist mode and the parking assist mode, are coupled to the input side of the driving assist control unit 11.

In the embodiment, as the sensors and units used for executing the driving assist mode and the parking assist mode, a front-side recognition sensor 21, a map locator unit 22, an autonomous driving sensor 23, a braking sensor 24, a selected position sensor 25, a rear-side sensor 26, front-left-side/front-right-side sensors 27, and rear-left-side/rear-right-side sensors 28 are provided. The braking sensor 24 turns ON a brake pedal by detecting an amount by which the driver has stepped on the brake pedal. The selected position sensor 25 detects a position selected as a result of the driver operating a select lever of transmission. The rear-side sensor 26 obtains information on the environment at the rear side of the vehicle M. In one embodiment, the front-side recognition sensor 21, the rear-side sensor 26, the front-left-side/front-right-side sensors 27, and the rear-left-side/rear-right-side sensors 28 may serve as an "environment information obtainer".

The front-side recognition sensor 21 is an image sensor. In the embodiment, the front-side recognition sensor 21 includes a stereo camera and an image processing unit (IPU) 21c. The stereo camera is constituted by a main camera 21a and a sub-camera 21b and uses charge-coupled devices (CCDs) or complementary metal oxide semiconductors (CMOSs), for example, as imaging elements. The main camera 21a and the sub-camera 21b have a predetermined base line length and are located on a front side of the vehicle M at a position above a rear-view mirror and near the windshield. The main camera 21a and the sub-camera 21b are disposed horizontally symmetrically along the width of the vehicle M with a space therebetween. The front-side recognition sensor 21 processes, by using the IPU 21c, an image of a predetermined area indicated by environment information obtained by the main camera 21a and the sub-camera 21b and sends the processed image to the driving assist control unit 11.

The map locator unit 22 includes a GNSS sensor 22a and a roadmap database 22b. The GNSS sensor 22a receives positioning signals emitted from multiple positioning satellites so as to obtain position coordinates of the vehicle M. The roadmap database 22b is a large-capacity storage medium, such as a hard disk drive (HDD), and stores roadmap information. As the roadmap information, the roadmap database 22b stores various types of road information (such as local roads, highways, freeways, road shapes, road directions, lane widths, and the number of lanes) used for executing the driving assist mode and also stores static information on parking lots (such as position information of the entrances and exits of parking lots and site information on each parking lot) used for executing the parking assist mode.

The driving assist control unit 11 performs map matching to match the position coordinates (latitude, longitude, and altitude) of the vehicle M obtained by the GNSS sensor 22a onto a roadmap indicated by the roadmap information stored in the roadmap database 22b, thereby estimating the current position of the vehicle M on the roadmap.

The autonomous driving sensor 23 is a sensor set used for allowing the vehicle M to autonomously drive. The autonomous driving sensor 23 is constituted by sensors, such as a vehicle velocity sensor that detects the velocity of the vehicle M, a yaw rate sensor that detects a yaw rate acting on the vehicle M, and a longitudinal acceleration sensor that detects the longitudinal acceleration.

The rear-side sensor 26 is constituted by a combination of a monocular camera using CCDs or CMOSs, for example, as imaging elements and at least one of an ultrasonic sensor, a millimeter wave radar, a microwave radar, an infrared sensor, a laser radar, or light detection and ranging (LiDAR). Alternatively, the rear-side sensor 26 may include a stereo camera constituted by a main camera and a sub-camera, as in the above-described front-side recognition sensor 21.

The front-left-side/front-right-side sensors 27 are constituted by a front-left-side sensor and a front-right-side sensor which are respectively installed on the left and right ridges of a front bumper of the vehicle M, for example, and respectively scan the area from the obliquely front left side to the left side and the area from the obliquely front right side to the right side in a circular sector shape. The rear-left-side/rear-right-side sensors 28 are constituted by a rear-left-side sensor and a rear-right-side sensor which are respectively installed on the left and right ridges of a rear bumper of the vehicle M, for example, and respectively scan the area from the rear side to the left side and the area from the rear side to the right side, which are difficult to scan by the front-left-side/front-right-side sensors 27, in a circular sector shape.

The front-left-side/front-right-side sensors 27 and the rear-left-side/rear-right-side sensors 28, which are each constituted by a millimeter radar, a microwave radar, and/or a LiDAR, for example, receive waves reflected by an object (such as a parked vehicle Pv or an outer wall when the parking assist mode is executed) so as to obtain environment information, such as the distance from the vehicle M to the object and the direction of the object.

The driving assist control unit 11 is coupled to the HMI monitor 31. On the HMI monitor 31, various screens, such as a mode selection screen and a parking space selection screen (see FIG. 8), are displayed. The mode selection screen is a screen for instructing the driver to select one of the driving assist mode and the parking assist mode to be executed by the driving assist control unit 11. On the parking space selection screen, parking capable spaces are displayed, together with the associated parking priorities, and the driver is instructed to select one of the displayed parking spaces. The HMI monitor 31 may double as a multi-information display of a combination meter or a navigation display device (navigation monitor) of a car navigation system.

A driving control actuator 32 and a notifying device 33 are coupled to the output side of the driving assist control unit 11. The driving control actuator 32 is an actuator set including a power actuator, an electric power steering (EPS) actuator, and a brake actuator, for example, which assist the driving of the vehicle M. The power actuator controls output from drive sources, such as an engine and an electric motor. The EPS actuator controls driving of an EPS motor. The brake actuator adjusts the brake fluid pressure to be applied to a brake wheel cylinder provided in each wheel. The notifying device 33 supplies various types of voice information to the driver while the driving assist mode or the parking assist mode is being executed.

Figure 2:
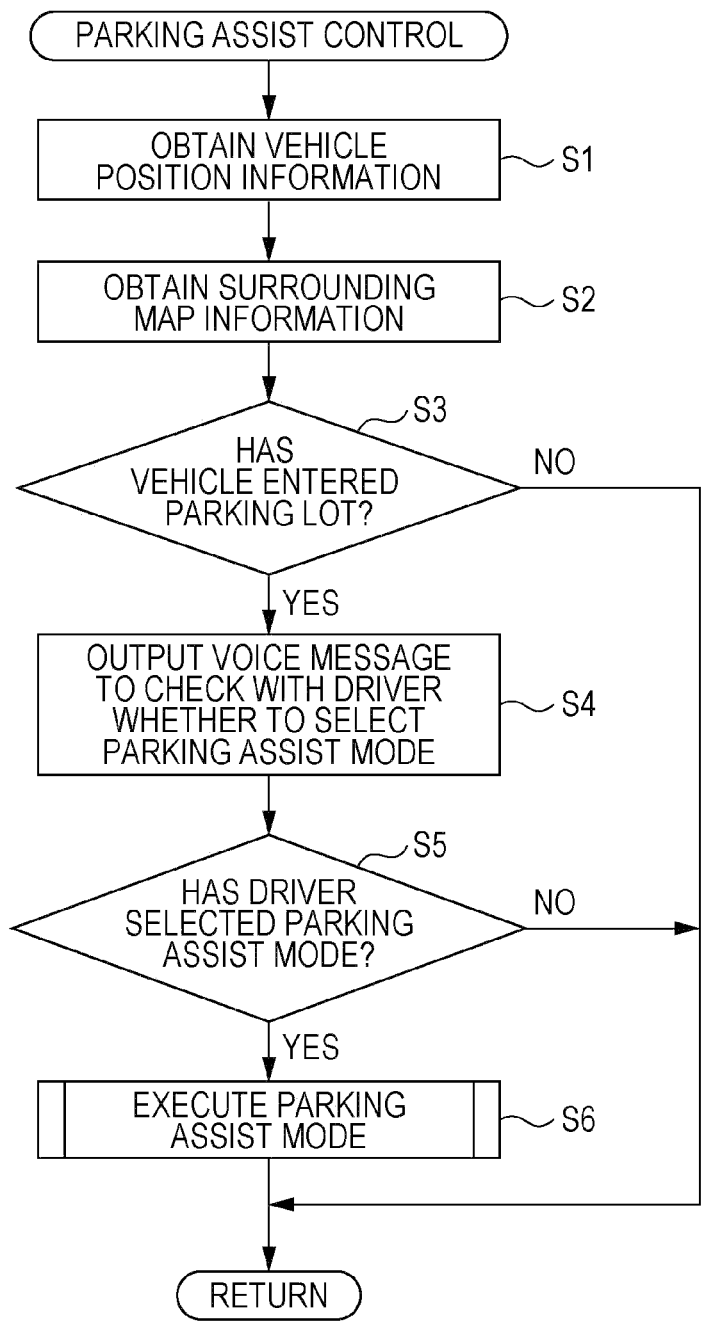
FIG. 2 is a flowchart illustrating a parking assist control routine.

The driving assist control unit 11 has a parking assist control function to assist the vehicle M in parking in a parking space on behalf of the driver or to assist the driver in parking by himself/herself. For example, the driving assist control unit 11 performs parking assist control in accordance with a parking assist control routine illustrated in FIG. 2. This routine is executed at regular intervals after the system is started.

In step S1, the driving assist control unit 11 obtains vehicle position information from the map locator unit 22. In step S2, the driving assist control unit 11 obtains surrounding map information on the environment around the vehicle M from the map locator unit 22, based on the vehicle position information.

Then, in step S3, the driving assist control unit 11 performs map matching to match the position of the vehicle M onto the surrounding map so as to check whether the vehicle M has entered a parking lot. If the vehicle M is found to have entered a parking lot, the driving assist control unit 11 proceeds to step S4. If the vehicle M has not entered a parking lot, the driving assist control unit 11 exits from the routine.

In step S4, the driving assist control unit 11 causes the notifying device 33 to output a voice message to check with the driver about whether to set the assist mode to the parking assist mode, and also displays the mode selection screen on the HMI monitor 31. Then, in step S5, the driving assist control unit 11 determines whether the driver has selected the parking assist mode. If the driver has selected the parking assist mode, the driving assist control unit 11 proceeds to step S6. If the driver has not selected the parking assist mode after the lapse of a predetermined time after the voice message is output or if the driver has selected manual driving on the HMI monitor 31, the driving assist control unit 11 exits from the routine.

Figure 3:
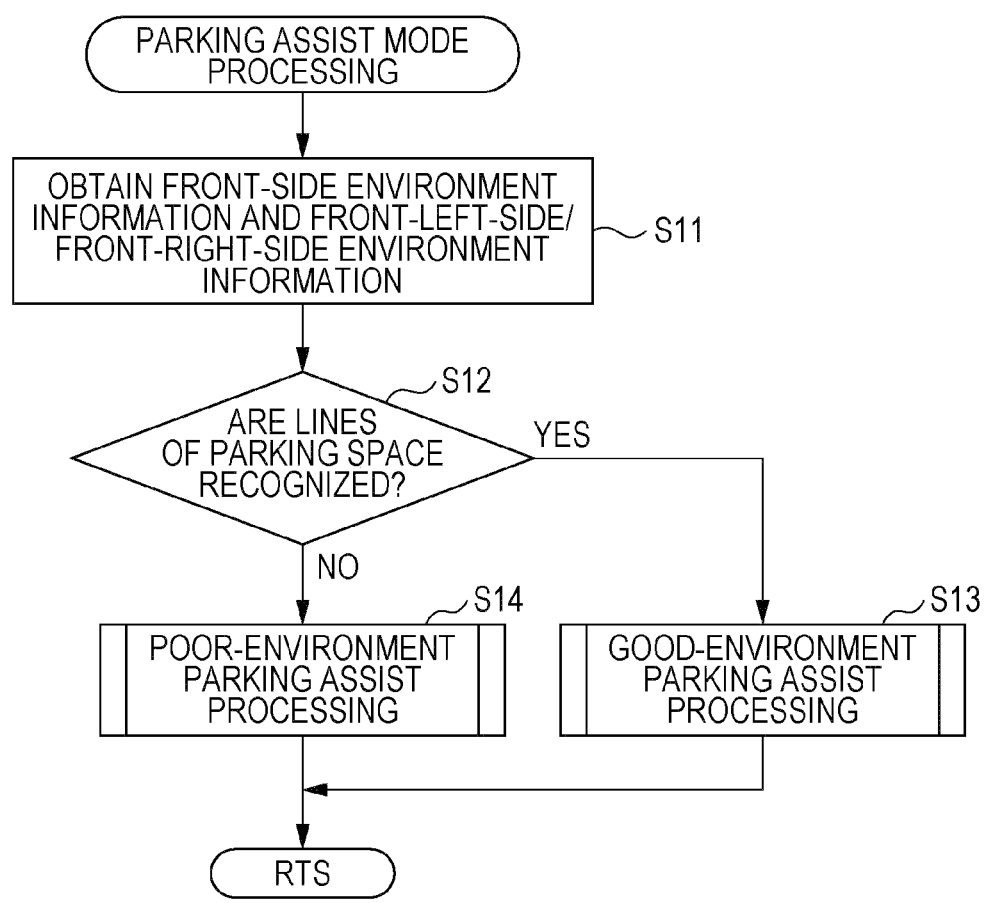
FIG. 3 is a flowchart illustrating a parking assist mode sub-routine.

In step S6, the driving assist control unit 11 executes the parking assist mode and exits from the routine. The parking assist mode is executed in accordance with a parking assist mode sub-routine illustrated in FIG. 3. In this sub-routine, in step S11, the driving assist control unit 11 obtains front-side environment information from the front-side recognition sensor 21 and front-left-side/front-right-side environment information from the front-left-side/front-right-side sensors 27.

Then, in step S12, from the obtained front-side environment information and front-left-side/front-right-side environment information, the driving assist control unit 11 checks whether the lines of parking spaces drawn on the road surface are being recognized. For example, based on the front-side environment information obtained from the front-side recognition sensor 21 and the front-left-side/front-right-side environment information obtained from the front-left-side/front-right-side sensors 27, the driving assist control unit 11 recognizes the parking space lines from the luminance difference between the road surface and the edges of the parking space lines or a change in the intensity (reflectance) of light or waves reflected by the road surface and the parking space lines.

If it is determined in step S12 that the parking space lines are recognized, the driving assist control unit 11 proceeds to step S13. In step S13, the driving assist control unit 11 executes good-environment parking assist processing and then exits from the routine. Good-environment parking assist processing is the same as known parking assist processing for guiding a vehicle to a parking space based on parking space lines, and an explanation thereof will thus be omitted.

Figure 4:
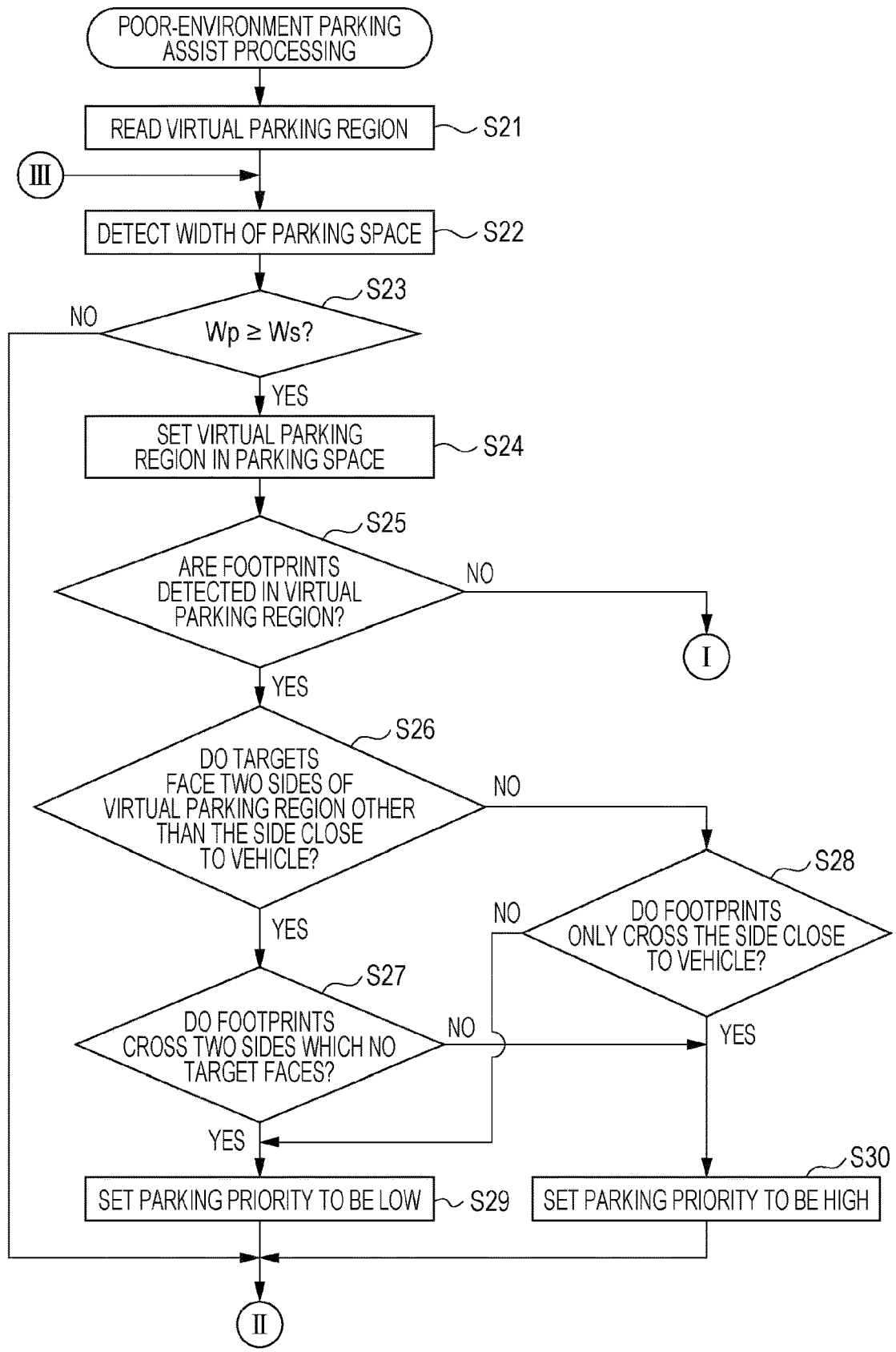
FIGS. 4 through 6 are a flowchart illustrating a poor-environment parking assist sub-routine.
Figure 5:
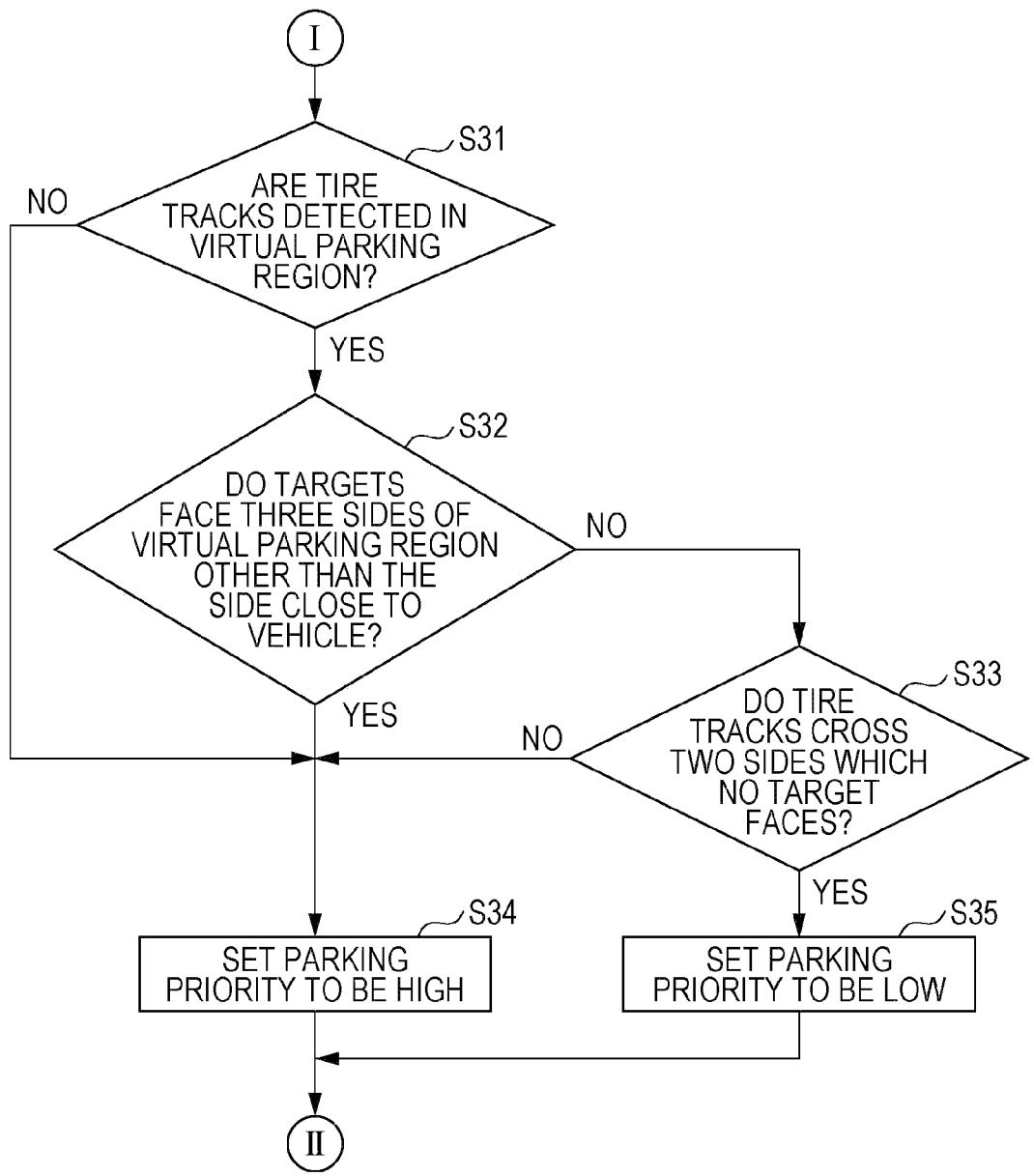
Figure 6:
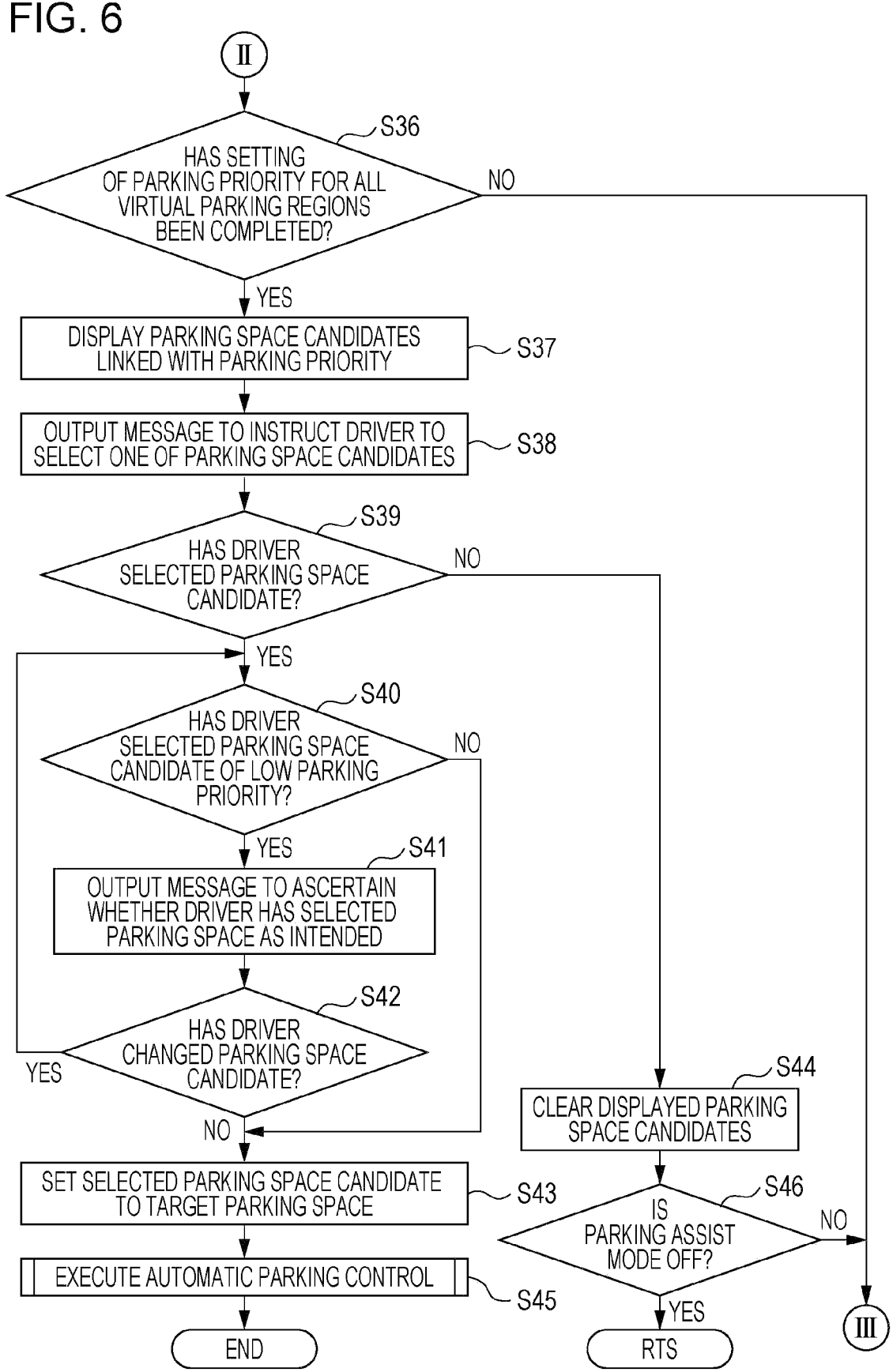

Conversely, if it is determined in step S12 that the parking space lines are not recognized because the road surface is covered with snow or mud, for example, the driving assist control unit 11 proceeds to step S14. In step S14, the driving assist control unit 11 executes poor-environment parking assist processing and exits from the routine. Poor-environment parking assist processing is executed in accordance with a poor-environment parking assist sub-routine illustrated in FIGS. 4 through 6.

Figure 7A:
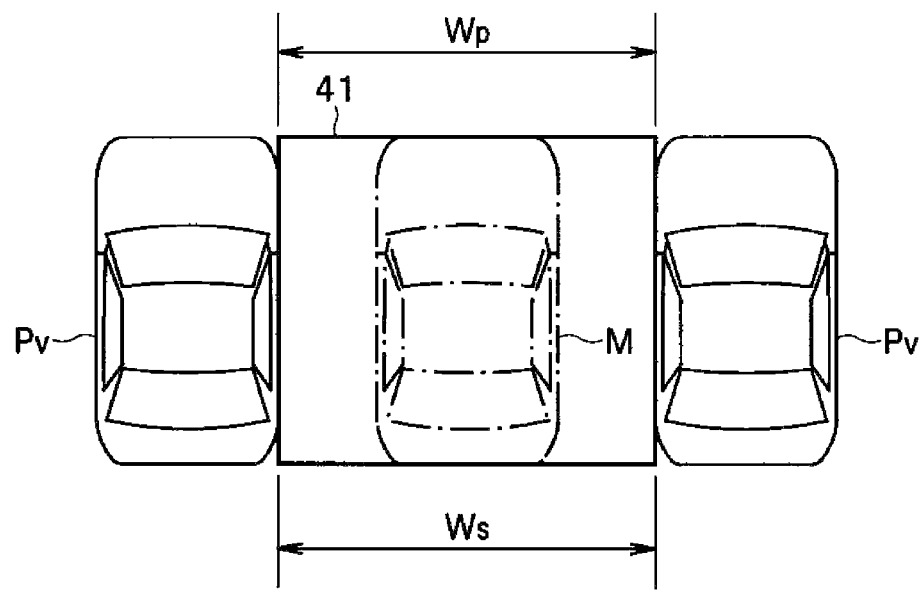
FIG. 7A illustrates an example in which the width between adjacent parked vehicles is equal to the width of a virtual parking region for parking a vehicle.
Figure 7B:
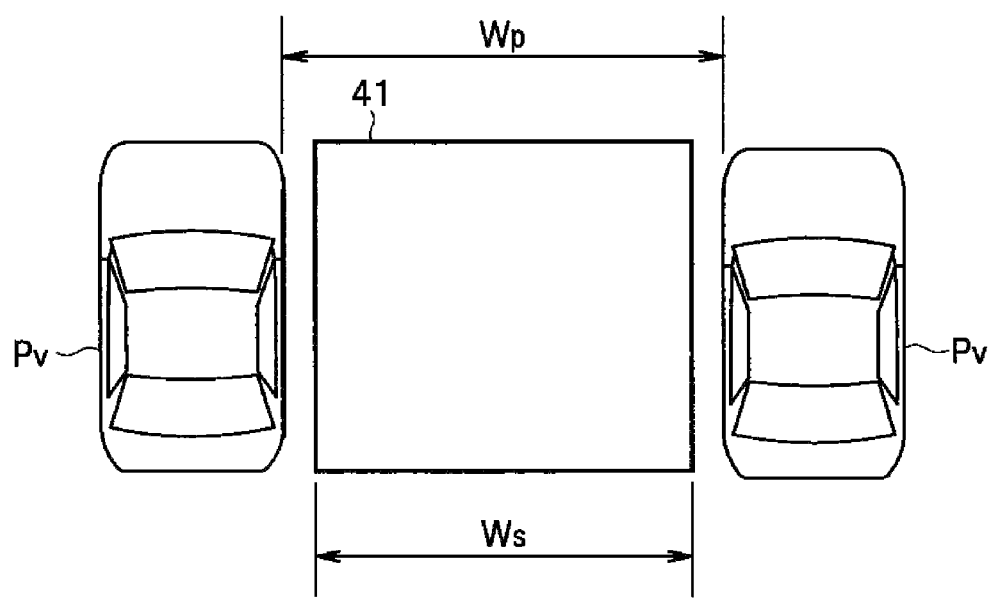
FIG. 7B illustrates an example in which the width between adjacent parked vehicles is larger than the width of a virtual parking region for parking a vehicle.
Figure 7C:
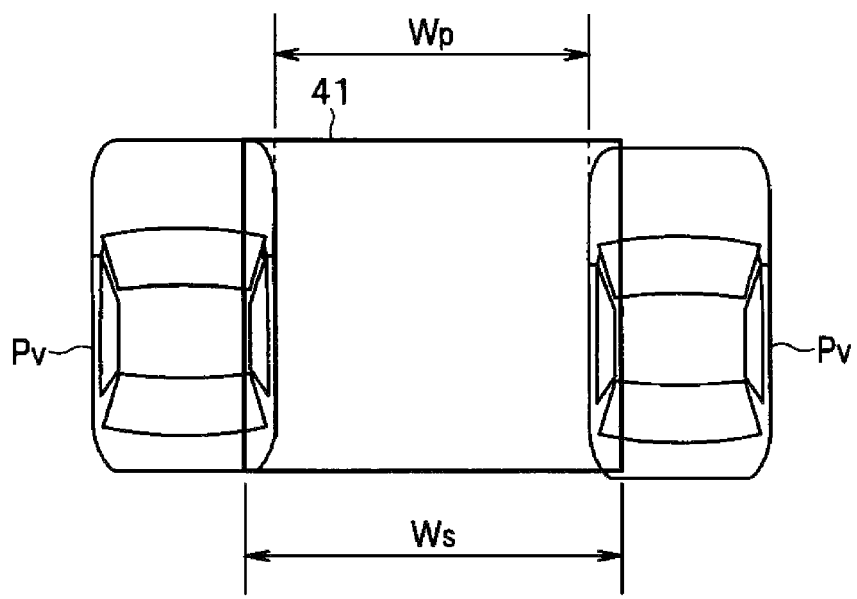
FIG. 7C illustrates an example in which the width between adjacent parked vehicles is smaller than the width of a virtual parking region for parking a vehicle.

In this sub-routine, in step S21, the driving assist control unit 11 first reads a virtual parking region 41. Data on the virtual parking region 41 is stored in advance in a storage, such as a ROM or a non-volatile memory, as fixed data. The virtual parking region 41 is used as a reference to check whether the vehicle M can be parked in a certain parking space under a poor environment. For example, as illustrated in FIGS. 7A through 7C, the virtual parking region 41 has a rectangular shape having four sides perpendicular to each other. The front-back sides of the virtual parking region 41 are set to be the front-back length of the vehicle M, while the left-right sides are set to have a sufficient parking width Ws. The sufficient parking width Ws is determined by adding an allowance width to the width of the vehicle M.

Then, in step S22, the driving assist control unit 11 detects the width of a parking space (parking space width) Wp. The parking space width Wp is detected in the following manner. Based on the front-side environment information obtained from the front-side recognition sensor 21 and the front-left-side/front-right-side environment information obtained from the front-left-side/front-right-side sensors 27, objects, such as vehicles parked side by side (parked vehicles) Pv (see FIG. 9) and outer walls, are recognized, and the widths of the recognized objects (parked vehicles Pv and outer walls) and the forward distance from the vehicle M to each of the recognized objects are determined. From the determined widths and distances, the distance between objects adjacent to each other (parking space width) is calculated. In one embodiment, processing in step S22 may correspond to processing of a "parking space width calculator".

Then, the driving assist control unit 11 proceeds to step S23 to compare the parking space width Wp with the sufficient parking width Ws. If the parking space width Wp is greater than or equal to the sufficient parking width Ws (Wp≥Ws), the driving assist control unit 11 determines that this parking space is sufficient for parking the vehicle M and proceeds to step S24. Conversely, if the parking space width Wp is smaller than the sufficient parking width Ws (Wp<Ws), the driving assist control unit 11 determines that this parking space is not sufficient for parking the vehicle M and proceeds to step S36. In one embodiment, processing in step S23 may correspond to processing of a "parking width comparator".

In step S24, the driving assist control unit 11 sets the virtual parking region 41 in the parking space and proceeds to step S25. The virtual parking region 41 is set so that the widthwise center of the virtual parking region 41 matches that of the parking space and that the front side of the virtual parking region 41 close to the vehicle M becomes flush with the forward edges of the adjacent objects. In one embodiment, processing in step S24 may correspond to processing of a "virtual parking region setter".

If, for example, the distance between the objects (parking space width Wp) is twice as large as the sufficient parking width Ws or even larger, multiple virtual parking regions 41 that can be accommodated in this parking space are set at regular intervals. If it is found in step S23 that the distance between the parked vehicles Pv is wide enough to accommodate three or more virtual parking regions 41, it means that this parking space is too large and the driving assist control unit 11 may proceed to step S36 without setting a virtual parking region 41.

In a known driving assist control unit, every time a virtual parking region 41 is set in step S24, it is displayed on the HMI monitor 31 and outputs a voice message to check with the driver about whether to automatically park the vehicle M in this virtual paring region 41. That is, the known driving assist control unit makes the driver check the parking position every time a virtual parking region 41 is set, which increases the number of selection times for the driver and becomes burdensome. In contrast, in the embodiment, after all virtual parking regions 41 are set based on the front-side environment information and front-left-side/front-right-side environment information, they are displayed together on the HMI monitor 31, as in steps S36 and S37, which will be discussed later. This can decrease the number of selection times for the driver before the driver finally selects a desired parking position.

The driving assist control unit 11 then proceeds to step S25. In steps S25 through S35, the parking priority for the virtual parking region 41 set in step S24 is determined. In step S25, based on the front-side environment information obtained from the front-side recognition sensor 21 and the front-left-side/front-right-side environment information obtained from the front-left-side/front-right-side sensors 27, it is determined whether footprints 51 are detected as a movement trace within the virtual parking region 41 set in step S24. Footprints 51 are detected in the following manner, for example. Based on the obtained front-side environment information and front-left-side/front-right-side environment information, the luminance difference generated on steps (edges) on the snow surface or mud surface due to the presence of possible footprints or a change in the intensity (reflectance) of light or waves reflected by the snow surface or mud surface is found. Then, based on the luminance difference or reflectance, known pattern matching, for example, is performed on a series of feature points representing the outlines of possible footprints, thereby recognizing the footprints 51. In one embodiment, processing in step S25 described above and processing in step S31, which will be discussed later, may correspond to processing of a "movement trace detector".

If footprints 51 are detected within the virtual parking region 41, the driving assist control unit 11 proceeds to step S26. If no footprints 51 are detected, the driving assist control unit 11 proceeds to step S36. In step S25, the number of footprints 51 within the virtual parking region 41 may be counted. If the number of footprints 51 exceeds a preset threshold, which is used for determining whether the virtual parking region 41 is a sidewalk, the driving assist control unit 11 may proceed to step S26. If the number of footprints 51 is lower than the preset threshold, the driving assist control unit 11 may proceed to step S31.

Figure 10:
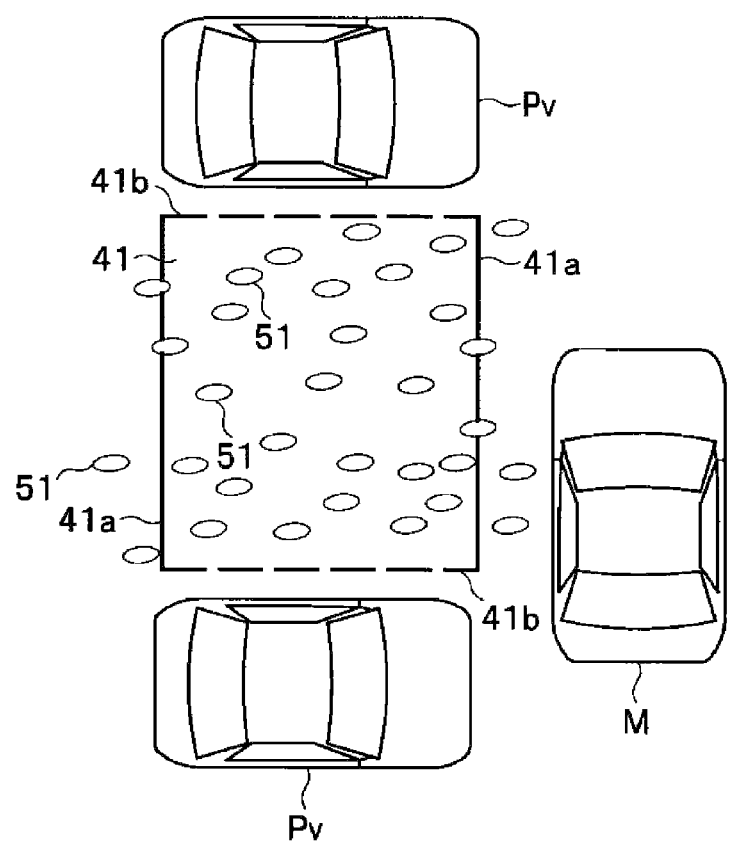
FIG. 10 is a plan view illustrating a state in which footprints cross two opposing sides of a virtual parking region.

In step S26, the driving assist control unit 11 checks which side of the virtual parking region 41 an object faces, based on the front-side environment information and front-left-side/front-right-side environment information. If an object faces each of two sides of the virtual parking region 41 other than the side close to the vehicle M, the driving assist control unit 11 proceeds to step S27. If an object faces each of three sides or an object faces one side of the virtual parking region 41 other than the side close to the vehicle M, the driving assist control unit 11 branches off to step S28. There are two modes in which an object (parked vehicle Pv in FIGS. 10 and 11) faces each of two sides of the virtual parking region 41 other than the side close to the vehicle M. One mode is that, as illustrated in FIG. 10, an object (parked vehicle Pv in FIG. 10) faces each of two sides 41b adjacent to a side 41a close to the vehicle M.

Figure 11:
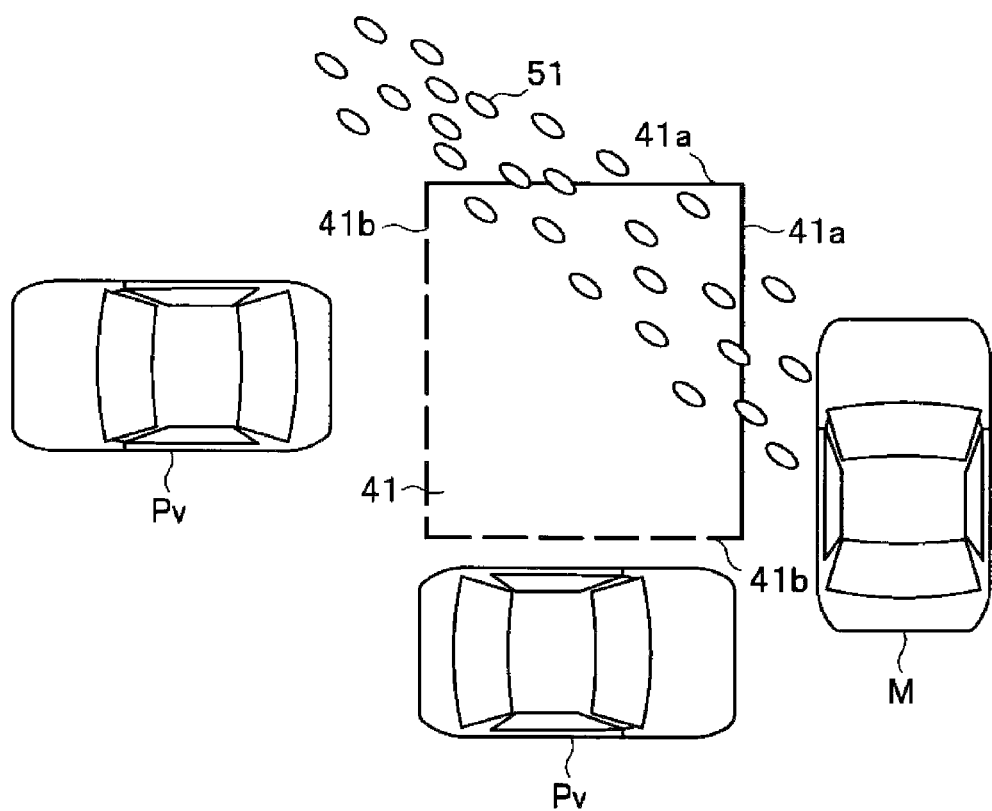
FIG. 11 is a plan view illustrating a state in which footprints cross two adjacent sides of a virtual parking region.

The other mode is that, as illustrated in FIG. 11, an object (parked vehicle Pv in FIG. 11) faces one of the two sides 41b adjacent to the side 41a close to the vehicle M, while another object (parked vehicle Pv in FIG. 11) faces the side 41b opposing the side 41a close to the vehicle M. In FIGS. 10 through 15, a side of the virtual parking region 41 that an object does not face is set to be a side 41a, while a side of the virtual parking region 41 that an object faces is set to be a side 41b. In one embodiment, processing in step S26 described above and processing in step S32, which will be discussed later, may correspond to processing of an "object detector".

Figure 13:
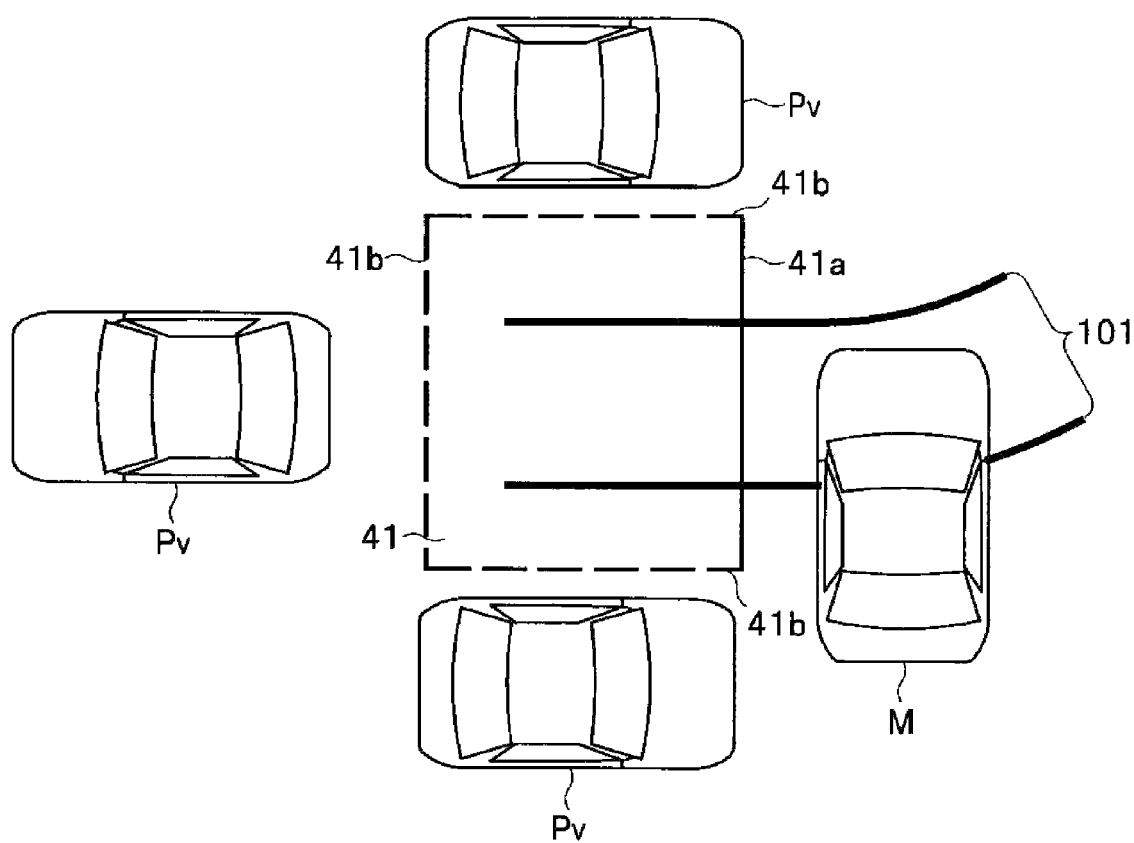
FIG. 13 is a plan view illustrating a state in which parked vehicles face three sides of a virtual parking region.

A mode in which an object faces each of the three sides of the virtual parking region 41 other than the side close to the vehicle M is a state illustrated in FIG. 13. In FIG. 13, the three sides other than the side that a vehicle enters and exists from are surrounded by objects (parked vehicles Pv in FIG. 13). A mode in which an object faces one side of the virtual parking region 41 other than the side close to the vehicle M is a state of parking space candidates Ps5 and Ps6 illustrated in FIG. 9. As illustrated in FIG. 9, there is a large space (parking space candidates Ps5 and Ps6) between adjacent objects (parked vehicles Pv) and two virtual parking regions 41 are set between the adjacent parked vehicles Pv. Details of parking space candidates will be discussed later.

In step S27, the driving assist control unit 11 checks whether the footprints 51 detected in the virtual parking region 41 continuously extend and intersect (cross) the two sides 41a which no object faces. If an object faces each of the two sides 41b of a virtual parking region 41, one of the sides 41a which no object faces is the side close to the vehicle M. The two sides 41a which no object faces may be the side 41a close to the vehicle M and the opposing side 41a, as illustrated in FIG. 10, or the side close to the vehicle M and the adjacent side 41a, as illustrated in FIG. 11. If the footprints 51 continuously extend from the side 41a close to the vehicle M and intersect (cross) the other side 41a, the driving assist control unit 11 determines that the currently set virtual parking region 41 is likely to be a sidewalk. The driving assist control unit 11 then proceeds to step S29.

Figure 12:
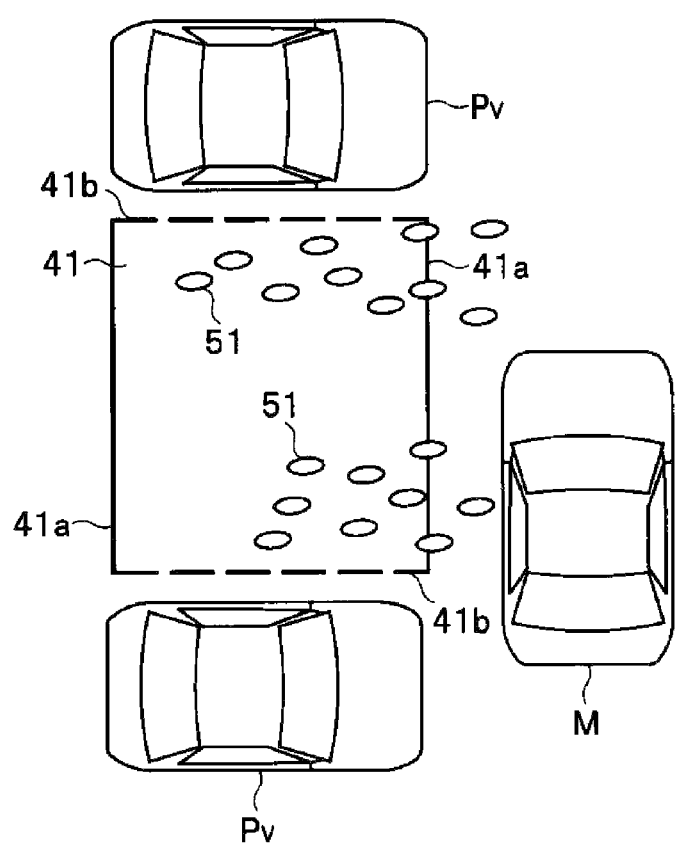
FIG. 12 is a plan view illustrating a state in which footprints only cross the side of a virtual parking region where a vehicle is positioned.

As illustrated in FIG. 12, when no object faces the side 41a close to the vehicle M and the opposing (or adjacent) side 41a and when footprints 51 only intersect (cross) the side 41a close to the vehicle M, the driving assist control unit 11 determines that the footprints 51 detected in the currently set virtual parking region 41 are likely to be those left by an occupant having got in and out of a parked vehicle and branches off to step S30.

In step S28, the driving assist control unit 11 determines whether the footprints 51 only cross the side 41a close to the vehicle M. As discussed above, even when a object faces only one side other than the side 41a close to the vehicle M, if the footprints 51 only cross the side 41a close to the vehicle M, the driving assist control unit 11 determines that the footprints 51 in the currently set virtual parking region 41 are likely to be those left by an occupant of a vehicle having parked in the space corresponding to the virtual parking region 41. If a object faces each of the three sides 41b of the virtual parking region 41 other than the side 41a close to the vehicle M, the virtual parking region 41 is likely to be a space where the vehicle M can park. Even in this case, by checking whether the footprints 51 only cross the side 41a close to the vehicle M, the driving assist control unit 11 can determine with higher accuracy whether the vehicle M can park in this space.

If it is determined in step S28 that the footprints 51 only cross the side 41a close to the vehicle M, the driving assist control unit 11 determines that the footprints 51 are those of an occupant having got in and out of a parked vehicle Pv and proceeds to step S30. If the footprints 51 cross a side 41a which no object faces, the driving assist control unit 11 determines that the currently set virtual parking region 41 is less likely to be a parking space and proceeds to step S29. If the driving assist control unit 11 shifts from step S27 or S28 to step S29, it sets the parking priority to be low since the currently set virtual parking region 41 is less likely to be a parking space. The driving assist control unit 11 then proceeds to step S36. If the driving assist control unit 11 shifts from step S27 or S28 to step S30, it sets the parking priority to be high (recommended) since the currently set virtual parking region 41 is likely to be a parking space. The driving assist control unit 11 then proceeds to step S36. In one embodiment, processing in steps S26 through 30 described above and processing in steps S32 through 35, which will be discussed later, may correspond to processing of a "parking priority setter".

If the driving assist control unit 11 shifts from step S25 to step S31, based on the front-side environment information obtained from the front-side recognition sensor 21 and the front-left-side/front-right-side environment information obtained from the front-left-side/front-right-side sensors 27, the driving assist control unit 11 determines whether tire tracks 101 are detected as a movement trace in the virtual parking region 41 set in step S24. Tire tracks 101 are detected in the following manner, for example. Based on the front-side environment information and front-left-side/front-right-side environment information, the luminance difference generated on steps (edges) on the snow surface or mud surface due to the presence of possible tire tracks or a change in the intensity (reflectance) of light or waves reflected by the snow surface or mud surface is found. Then, based on the luminance difference or reflectance, known pattern matching, for example, is performed on a series of feature points representing the edges of possible tire tracks, thereby recognizing the tire tracks 101.

If tire tracks 101 are detected, the driving assist control unit 11 proceeds to step S32. If tire tracks 101 are not detected, the driving assist control unit 11 proceeds to step S34. In step S32, based on the above-described front-side environment information and front-left-side/front-right-side environment information, the driving assist control unit 11 determines whether an object (parked vehicle Pv or outer wall) faces each of the three sides of the virtual parking region 41 other than the side 41a close to the vehicle M. If an object faces each of the three sides of the virtual parking region 41, the driving assist control unit 11 proceeds to step S34. As illustrated in FIG. 13, if the three sides 41b other than the side 41a close to the vehicle M are surrounded by objects, the tire tracks 101 detected in the virtual parking region 41 are those left when a vehicle has entered and exited from the space of the virtual parking region 41, and the driving assist control unit 11 can determine that this space is likely to be a parking space.

Figure 14:
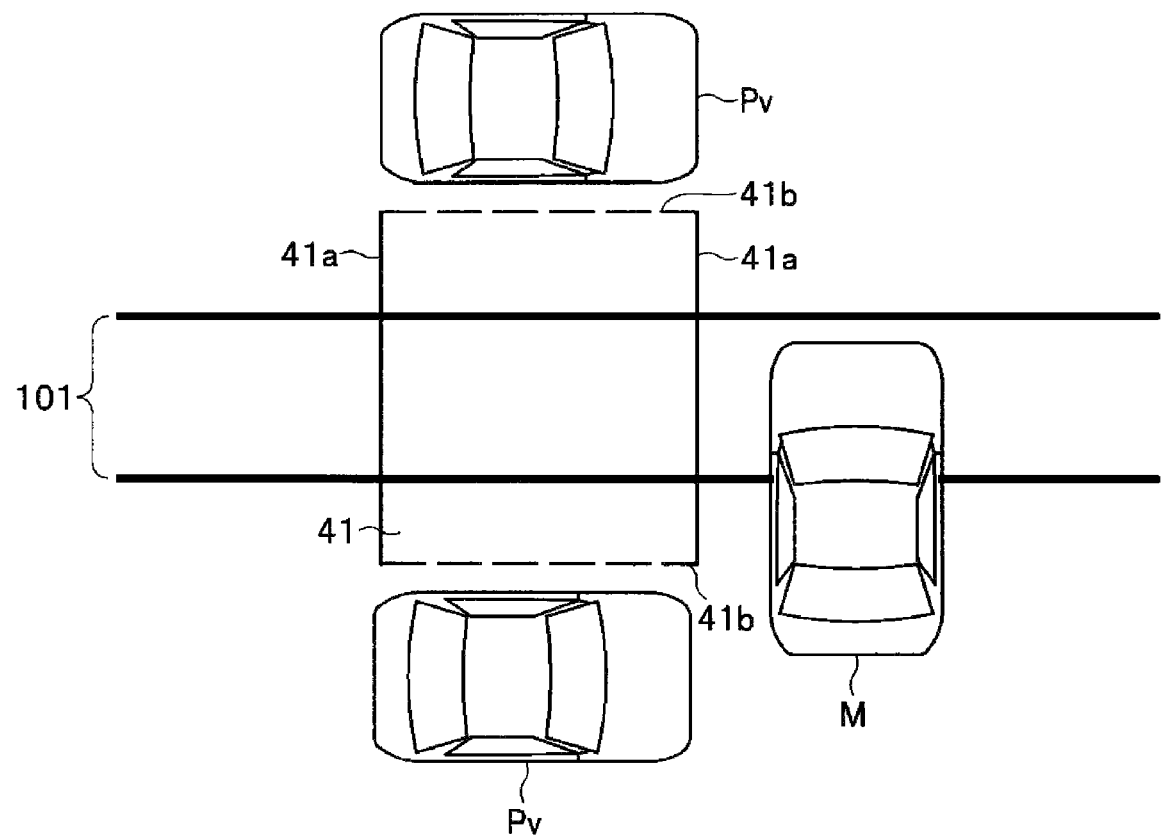
FIG. 14 is a plan view illustrating a state in which tire tracks cross two opposing sides of a virtual parking region.
Figure 15:
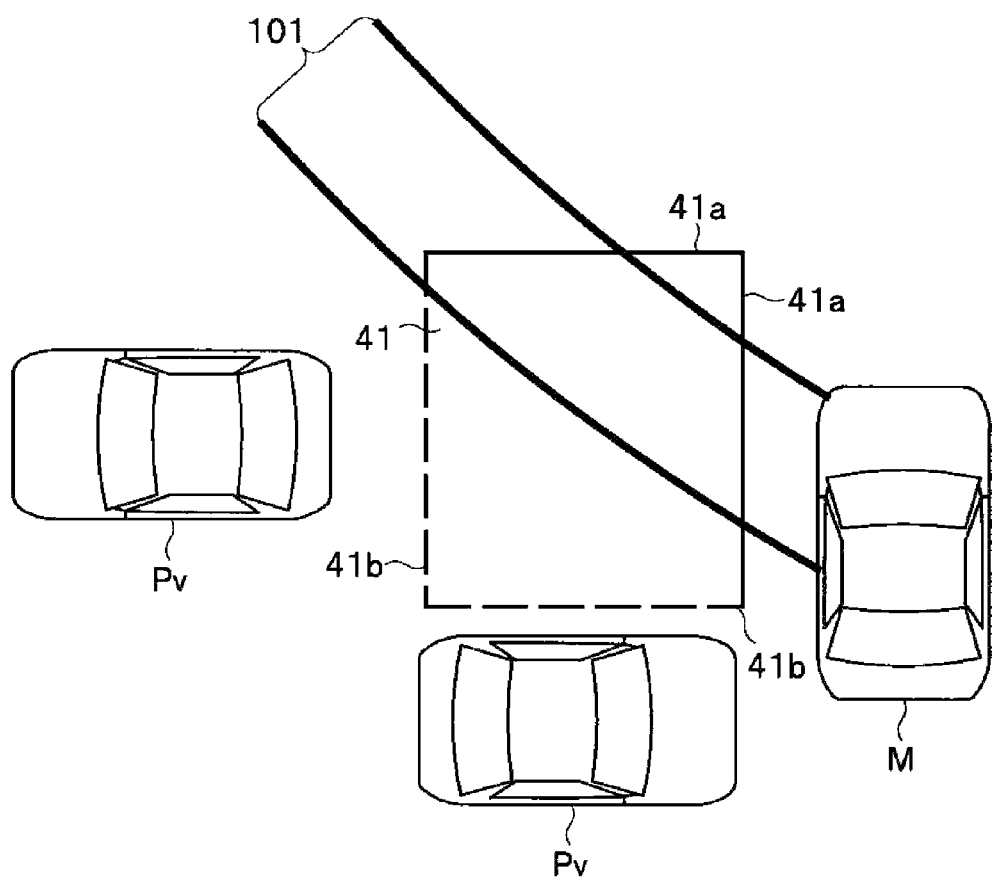
FIG. 15 is a plan view illustrating a state in which tire tracks cross two adjacent sides of a virtual parking region.

If an object faces only one side or two sides of the virtual parking region 41 other than the side 41a close to the vehicle M, the driving assist control unit 11 branches off to step S33. There are two modes in which an object (parked vehicle Pv in FIGS. 14 and 15) faces each of two sides other than the side 41a close to the vehicle M. One mode is that, as illustrated in FIG. 14, objects (parked vehicles Pv) face the two sides 41b adjacent to the side 41a close to the vehicle M. The other mode is that, as illustrated in FIG. 15, an object (parked vehicle Pv) faces one of the two sides 41b adjacent to the side 41a close to the vehicle M, while another object (parked vehicle Pv) faces the side 41b opposing the side 41a close to the vehicle M.

In step S33, the driving assist control unit 11 checks whether tire tracks 101 intersect (cross) the two sides 41a which no object faces. If, as illustrated in FIGS. 14 and 15, the tire tracks 101 continuously cross the side 41a close to the vehicle M and the other side 41a, the driving assist control unit 11 determines that the currently set virtual parking region 41 is likely to be a driving lane and proceeds to step S35.

If the tire tracks 101 do not cross the two sides 41a of the virtual parking regions 41, that is, if the tire tracks 101 only cross the side 41a close to the vehicle M, the driving assist control unit 11 determines that the tire tracks 101 are those left when a vehicle is parked and that the virtual parking region 41 is likely to be a parking space. The driving assist control unit 11 then proceeds to step S34. When an object faces only one side 41b other than the side 41a close to the vehicle M, the driving assist control unit 11 makes a determination in the following manner. If the tire tracks 101 cross two sides 41a which no object faces, the driving assist control unit 11 determines that the virtual parking region 41 is likely to be a driving lane. If the tire tracks 101 only cross the side 41a close to the vehicle M, the driving assist control unit 11 determines that the virtual parking region 41 is likely to be a parking space.

If the driving assist control unit 11 shifts from one of steps S31 through S33 to step S34, it sets the parking priority to be high since the currently set virtual parking region 41 is likely to be a parking space. The driving assist control unit 11 then proceeds to step S36. If the driving assist control unit 11 shifts from step S33 to step S35, it sets the parking priority to be low since the currently set virtual parking region 41 is likely to be a driving lane. The driving assist control unit 11 then proceeds to step S36.

When the driving assist control unit 11 shifts from one of steps S29, S30, S34, and S35 to step S36, the driving assist control unit 11 determines whether the parking priority has been set for all the virtual parking regions 41 which have been determined to be parking capable spaces based on the above-described front-side environment information and front-left-side/front-right-side environment information. If the parking priority has not been set for all the virtual parking regions 41, the driving assist control unit 11 returns to step S22 in FIG. 4 to search for the next candidate of the virtual parking region 41. If the parking priority has been set for all the virtual parking regions 41, the driving assist control unit 11 proceeds to step S37.

Figure 8:
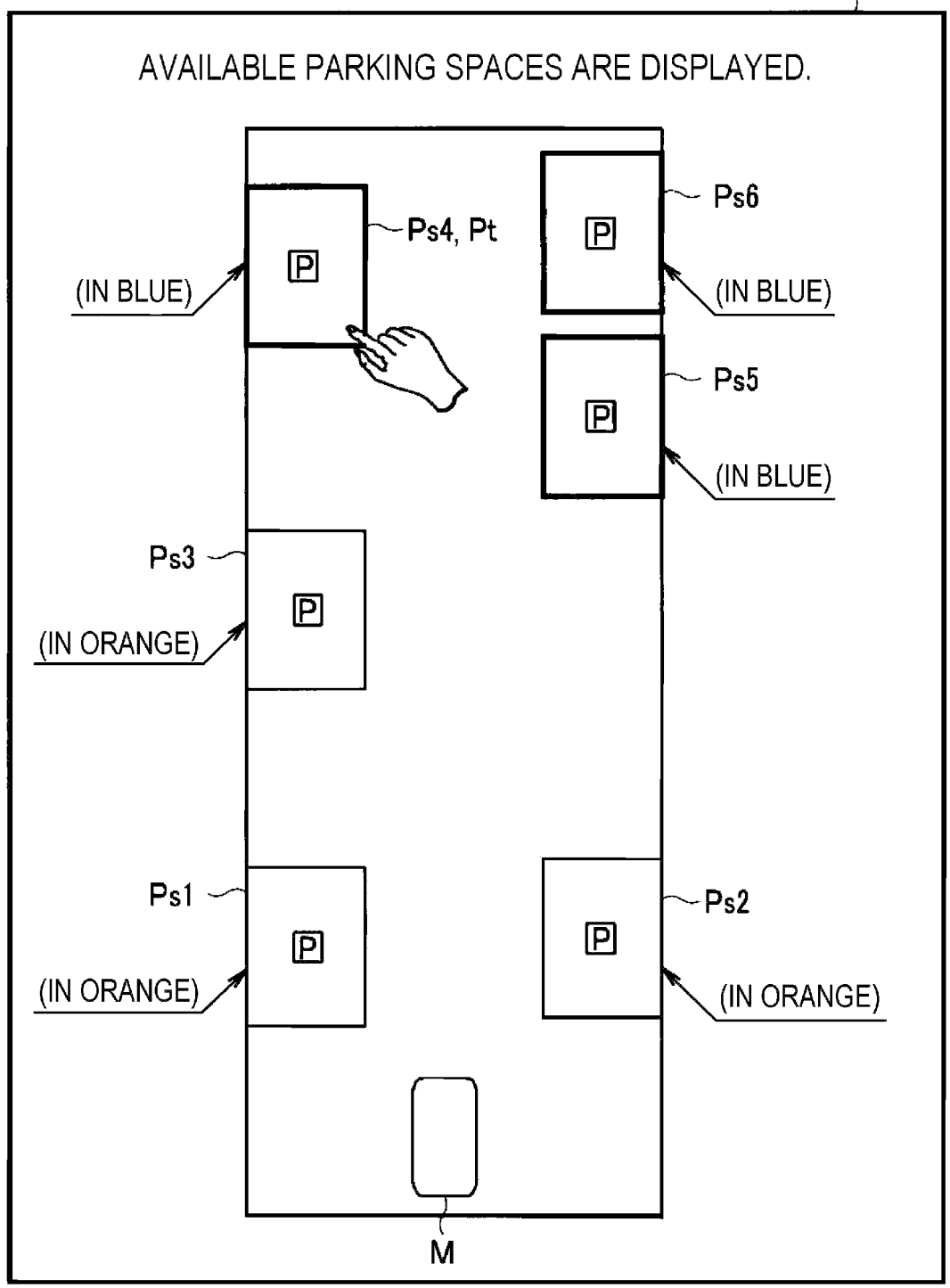
FIG. 8 illustrates a state in which parking space candidates are displayed on a human machine interface (HMI) monitor.

In step S37, the driving assist control unit 11 sets the virtual parking regions 41 to be parking space candidates Ps by linking the associated parking priorities to the virtual parking regions 41 and displays the parking space candidates together on the HMI monitor 31. In this case, as illustrated in FIG. 8, for example, the driving assist control unit 11 displays recommended parking space candidates Ps having a high parking priority in blue (indicated by the thick lines in FIG. 8) and parking space candidates Ps having a low parking priority in orange (indicated by the thin lines in FIG. 8) so that the driver can instantly visually distinguish them from each other. As illustrated in FIG. 9, parking space candidates Ps1 through Ps6 set on the left and right sides of the driving lane where the vehicle M is driving are all displayed on the HMI monitor 31 in a bird's eye view.

Then, the driving assist control unit 11 proceeds to step S38 to drive the notifying device 33 to output a voice message to instruct the driver to select one of the parking space candidates Ps (Ps1 through Ps6 in FIG. 8) displayed on the HMI monitor 31. In step S39, the driving assist control unit 11 determines which one of the parking space candidates Ps the driver has selected. The driver can select a desired parking space candidate Ps by touching it displayed on the HMI monitor 31.

If it is determined in step S39 that the driver has selected one of the parking space candidates Ps, the driving assist control unit 11 proceeds to step S40. If a predetermined time has elapsed after the voice message is output or if the vehicle M has passed by the parking space candidates Ps displayed on the HMI monitor 31, the driving assist control unit 11 branches off to step S44.

The driving assist control unit 11 checks in step S40 whether the driver has selected a parking space candidate Ps (one of the parking space candidates Ps1 through Ps3 in FIG. 8) having a low parking priority. If the driver has selected a parking space candidate Ps (one of the parking space candidates Ps4 through Ps6) having a high parking priority, the driving assist control unit 11 proceeds to step S43. If the driver has selected a parking space candidate Ps having a low priority, the driving assist control unit 11 proceeds to step S41.

The driver may have selected a parking space candidate Ps having a low priority by mistake. Thus, in step S41, the driving assist control unit 11 drives the notifying device 33 to output a voice message to check whether the driver has intended to select the parking space candidate Ps having a low priority. In this manner, when a driver has selected a parking space candidate Ps having a low priority, a voice message is output to ascertain whether the driver has intended to select this parking space. This can decrease the possibility that the driver wrongly guides the vehicle M to a sidewalk or a driving lane where parking is prohibited, thereby reducing the burden on the driver.

Then, the driving assist control unit 11 proceeds to step S42 to check whether the driver has changed the parking space candidate Ps. The driver can change the parking space candidate Ps by touching one of the parking space candidates Ps (Ps1 through Ps6 in FIG. 8) displayed on the HMI monitor 31. If the driver has changed the parking space candidate Ps, the driving assist control unit 11 returns to step S40. If a predetermined time has elapsed after the voice message is output or the driver has touched a setting button displayed on the HMI monitor 31, the driving assist control unit 11 determines that the driver has not changed the parking space candidate Ps and proceeds to step S43.

For example, even though the driving assist control unit 11 sets the parking priority of the parking space candidate Ps1 to be low since the footprints 51 cross the two sides of a virtual parking region 41, as illustrated in FIG. 9, the driver may visually check the parking space candidate Ps1 and determine that it is apparently a parking space. In such a situation, if the driving assist control unit 11 excludes the parking space candidate Ps1 from parking space candidates to be displayed on the HMI monitor 31, the results determined by the driving assist control unit 11 become different from the recognition results of the driver. This lowers the reliability in processing executed by the driving assist control unit 11. In the embodiment, the parking priority is linked to a parking space candidate Ps, which gives the driver more choices for a parking space candidate, thereby implementing a high level of parking assist. In one embodiment, processing in steps S37 through S42 may correspond to processing of a "display selector".

If the driving assist control unit 11 proceeds from step S40 or S42 to step S43, it sets the parking space candidate Ps selected by the driver (Ps4 in FIG. 8, for example) to a target parking space Pt and proceeds to step S45. In step S45, the driving assist control unit 11 executes automatic parking control to park the vehicle M in the target parking space Pt and completes the routine.

If it is determined in step S39 that the driver has not selected any parking space candidate Ps after the lapse of the predetermined time or the vehicle M has passed by the parking space candidates Ps displayed on the HMI monitor 31, the driving assist control unit 11 branches off to step S44 and clears all the parking space candidates Ps displayed on the HMI monitor 31. The driving assist control unit 11 then proceeds to step S46.

In step S46, the driving assist control unit 11 determines whether the parking assist mode is OFF. If the parking assist mode is found to be OFF, the driving assist control unit 11 exits from the routine. If the parking assist mode is found to be ON, the driving assist control unit 11 returns to step S22 in FIG. 4. The parking assist mode is turned OFF when the driver has performed a certain operation using a certain device, such as the HMI monitor 31. The parking assist mode is automatically turned OFF when the driving assist control unit 11 has detected that the vehicle M has exited from the parking lot.

Automatic parking control executed by the driving assist control unit 11 in step S45 will be briefly discussed below. As illustrated in FIG. 9, a target parking guiding route Gr for guiding the vehicle M to the target parking space Pt is first formed. The target parking guiding route Gr is set so that the widthwise center of the vehicle M matches that of the target parking space Pt. If, for example, the parking space width Wp between objects (parked vehicles Pv) is larger than the sufficient parking width Ws in the target parking space Pt by a predetermined factor or greater (1.5 times, for example), the edge of the sufficient parking width Ws on the side of the driver's seat of the vehicle M may be shifted toward the adjacent object (parked vehicle Pv), and then, the target parking space Pt may be set. Then, the target parking guiding route Gr may be formed so that the widthwise center of the vehicle M matches that of the target parking space Pt.

Then, the driving assist control unit 11 performs control to automatically park the vehicle M in the target parking space Pt as determined above and exits from the routine. The target parking guiding route Gr is set similarly to when it is set under the normal condition where the lines of parking spaces are recognized.

As a result of the vehicle M driving around the driving lane of the parking lot, information on the overall positions of the vehicles Pv parked in the parking lot can be obtained, and based on this information, parking space candidates Ps may be set in the entire parking lot.

As discussed above, in the embodiment, when assisting a vehicle M in automatically parking in a parking space of a parking lot under a poor environment where the lines of parking spaces are not recognized due to snow or mud, the parking space width Wp between adjacent objects (parked vehicles Pv or walls) is compared with the sufficient parking width Ws of a virtual parking region 41 set for the vehicle M. If the parking space width Wp is greater than or equal to the sufficient parking width Ws (WpWs), a virtual parking region 41 is set in the parking space having the parking space width Wp. Then, the parking priority is set for the parking space, based on the presence or the absence of footprints 51 or tire tracks 101 and how they are left in the virtual parking region 41 and the facing direction of an object along the virtual parking region 41. As a result, parking space candidates Ps (Ps1 through Ps6 in FIG. 8) obtained by linking the associated parking priorities to the virtual parking region 41 are displayed together on the HMI monitor 31. A driver can thus select a desired one of the displayed parking space candidates Ps (Ps1 through Ps6) at one time, thereby reducing the burden on the driver.

Since the parking priority is linked to each parking space candidate Ps, the driver can easily recognize a parking capable space. Even for a parking space candidate Ps having a low parking priority, the driver can choose this parking space candidate Ps if he/she determines that it is a parking capable space. This gives the driver more choices for a parking space candidate Ps, thereby implementing a high level of parking assist.

The disclosure is not restricted to the above-described embodiment. For example, the driver may drive around a parking lot by himself/herself and look for a parking space in which a virtual parking region 41 can be accommodated while visually checking the HMI monitor 31. Then, when the driver specifies such a parking space, he/she may stop the vehicle M in front of the specified parking space and select the parking assist mode. In response to this selection, the driving assist control unit 11 may check the parking priority for this parking space and inform the driver of the result.

Additionally, in step S45, the target parking guiding route Gr may be displayed on the HMI monitor 31 such that it is superimposed on a plan view of the surroundings of a parking space where the vehicle M is to be parked, and the driver may park the vehicle M by himself/herself in accordance with the target parking guiding route Gr.

According to an embodiment of the disclosure, a parking space candidate is set by linking the parking priority to a virtual parking region. Plural parking space candidates set in this manner are displayed together using a display selector so that a driver can select one of them. With this configuration, when assisting a vehicle in parking in a parking space using a parking assist function, a driver is not asked whether to select a parking space every time a parking space between parked vehicles is detected under a poor environment where the lines of a parking space are not recognized, thereby reducing the burden on the driver.

The driving assist control unit 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assist control unit 11 including the driving assist mode and the parking assist mode. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A parking assist system configured to guide a vehicle to a parking space in a parking lot, the parking assist system comprising:
   a sensor configured to obtain environment information on an environment around the vehicle;
   a storage configured to store data on a virtual parking region to be used for parking the vehicle;
   a processor configured to:
      calculate a width of the parking space based on the environment information obtained by the sensor;
      compare the width of the parking space with a width of the virtual parking region stored in the storage;
      set the virtual parking region in the parking space in response to determining that the width of the parking space is larger than or equal to the width of the virtual parking region;
      detect a movement trace within the set virtual parking region based on the environment information obtained by the sensor;
      determine whether an object faces at least one side of the set virtual parking region other than the side of the virtual parking region closest to the vehicle;
      set a parking priority for the virtual parking region in accordance with the detected movement trace and the object which faces the virtual parking region;
      display parking space candidates together to instruct a driver of the vehicle to select a parking space candidate, wherein the parking space candidates include the parking space candidate obtained by linking the parking priority to the virtual parking region; and
      set the parking space candidate selected by the driver to a target parking space, to guide the vehicle to the target parking space,
   wherein, in a case where the detected movement trace continuously crosses two sides of the virtual parking region, the processor is configured to set the parking priority for the virtual parking region to be low.

2. The parking assist system according to claim 1,
   wherein the detected movement trace is a series of footprints, and
   wherein, in a case where the series of footprints extends from inside the virtual parking region to outside, while only extending via the side of the virtual parking region closest to the vehicle, the processor is further configured to set the parking priority for the virtual parking region to be high.

3. A parking assist system configured to guide a vehicle to a parking space in a parking lot, the parking assist system comprising:
- a sensor configured to obtain environment information on an environment around the vehicle;
- a storage configured to store data on a virtual parking region to be used for parking the vehicle;
- a processor configured to:
  - calculate a width of the parking space based on the environment information obtained by the sensor;
  - compare the width of the parking space with a width of the virtual parking region stored in the storage;
  - set the virtual parking region in the parking space in response to determining that the width of the parking space is larger than or equal to the width of the virtual parking region;
  - detect a movement trace within the set virtual parking region based on the environment information obtained by the sensor;
  - determine whether an object faces at least one side of the set virtual parking region other than the side of the virtual parking region closest to the vehicle;
  - set a parking priority for the virtual parking region in accordance with the detected movement trace and the object which faces the virtual parking region;
  - display parking space candidates together to instruct a driver of the vehicle to select a parking space candidate, wherein the parking space candidates include the parking space candidate obtained by linking the parking priority to the virtual parking region; and
  - set the parking space candidate selected by the driver to a target parking space, to guide the vehicle to the target parking space,
- wherein, in a case where objects face two sides of the virtual parking region other than the side close to the vehicle, and the detected movement trace continuously crosses two sides of the virtual parking region, the processor is further configured to set the parking priority for the virtual parking region to be low.

4. The parking assist system according to claim 1, wherein, in a case where the driver has selected the parking space candidate having a low parking priority, the processor is further configured to check with the driver whether the driver has intended to select the parking space candidate having the low parking priority.

5. The parking assist system according to claim 2, wherein, in a case where the driver has selected the parking space candidate having a low parking priority, the processor is further configured to check with the driver whether the driver has intended to select the parking space candidate having the low parking priority.

6. The parking assist system according to claim 3, wherein, in a case where the driver has selected the parking space candidate having a low parking priority, the processor is further configured to check with the driver whether the driver has intended to select the parking space candidate having the low parking priority.

7. A parking assist system configured to guide a vehicle to a parking space in a parking lot, the parking assist system comprising:
- a sensor configured to obtain environment information on an environment around the vehicle;
- a storage configured to store data on a virtual parking region to be used for parking the vehicle;
- circuitry configured to:
  - calculate a width of the parking space based on the environment information obtained by the sensor;
  - compare the calculated width of the parking space with a width of the virtual parking region stored in the storage;
  - set the virtual parking region in the parking space in response to determining that the width of the parking space is larger than or equal to the width of the virtual parking region;
  - detect a movement trace within the set virtual parking region, based on the environment information obtained by the sensor;
  - determine whether an object faces at least one side of the set virtual parking region other than the side of the virtual parking region closest to the vehicle;
  - set a parking priority for the virtual parking region in accordance with the detected movement trace and the object which faces the virtual parking region;
  - display parking space candidates together to instruct a driver of the vehicle to select a parking space candidate, wherein the parking space candidates include the parking space candidate obtained by linking the parking priority to the virtual parking region; and
  - set the parking space candidate selected by the driver to a target parking space, to guide the vehicle to the target parking space,
- wherein, in a case where the detected movement trace continuously crosses two sides of the virtual parking region, the circuitry is configured to set the parking priority for the virtual parking region to be low.

* * * * *